June 29, 1954 A. E. CANFORA ET AL 2,682,574

ELECTRONIC DIPLEX TRANSMITTING DISTRIBUTOR

Filed March 29, 1952 8 Sheets-Sheet 1

INVENTOR
ARTHUR E. CANFORA & ANTHONY LIGUORI
BY
Charles H. Brown
ATTORNEY

INVENTOR
ARTHUR E. CANFORA &
ANTHONY LIGUORI
BY
Charles H. Brown
ATTORNEY

INVENTOR
ARTHUR E. CANFORA AND
ANTHONY LIGUORI
BY
Charles H. Brown
ATTORNEY

ELECTRONIC DIPLEX TRANSMITTING DISTRIBUTOR
Filed March 29, 1952 8 Sheets-Sheet 4
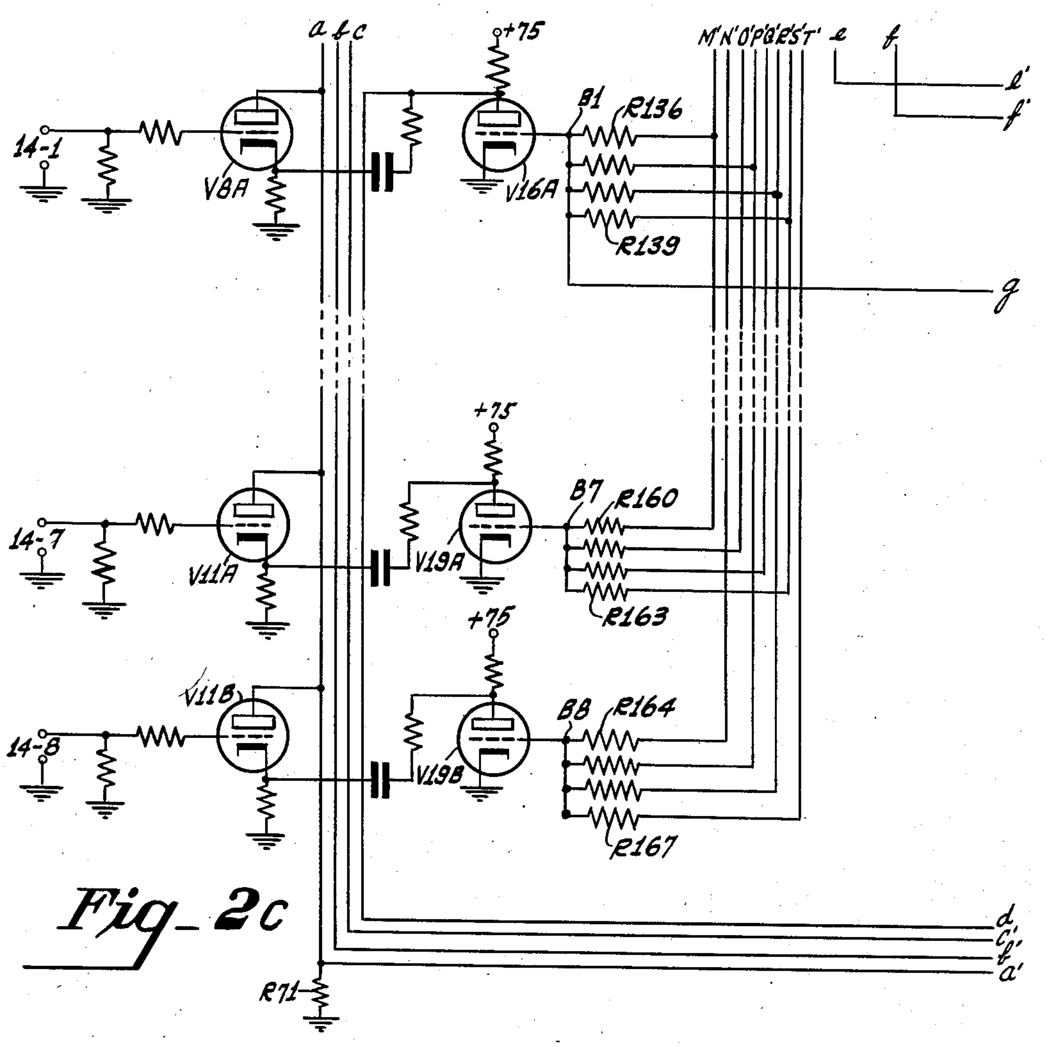
Fig. 2c
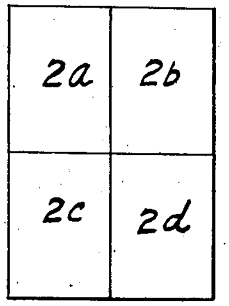
KEY TO FIG. 2
INVENTOR
ARTHUR E. CANFORA AND
ANTHONY LIGUORI
BY
Charles H. Brown
ATTORNEY INVENTOR
ARTHUR E. CANFORA AND
ANTHONY LIGUORI
BY
Charles H. Brown
ATTORNEY INVENTOR
ARTHUR E. CANFORA AND
ANTHONY LIGUORI
BY
Charles H. Brown
ATTORNEY INVENTOR
ARTHUR E. CANFORA AND
ANTHONY LIGUORI
BY
Charles H. Brown
ATTORNEY INVENTOR
ARTHUR E. CANFORA AND
ANTHONY LIGUORI
BY
Charles H. Brown
ATTORNEY Patented June 29, 1954 2,682,574

UNITED STATES PATENT OFFICE

2,682,574

ELECTRONIC DIPLEX TRANSMITTING DISTRIBUTOR

Arthur Eugene Canfora, Brooklyn, and Anthony Liguori, New York, N. Y., assignors to Radio Corporation of America, a corporation of Delaware Application March 29, 1952, Serial No. 279,432

18 Claims. (Cl. 178—61)

Figures 1, 3:
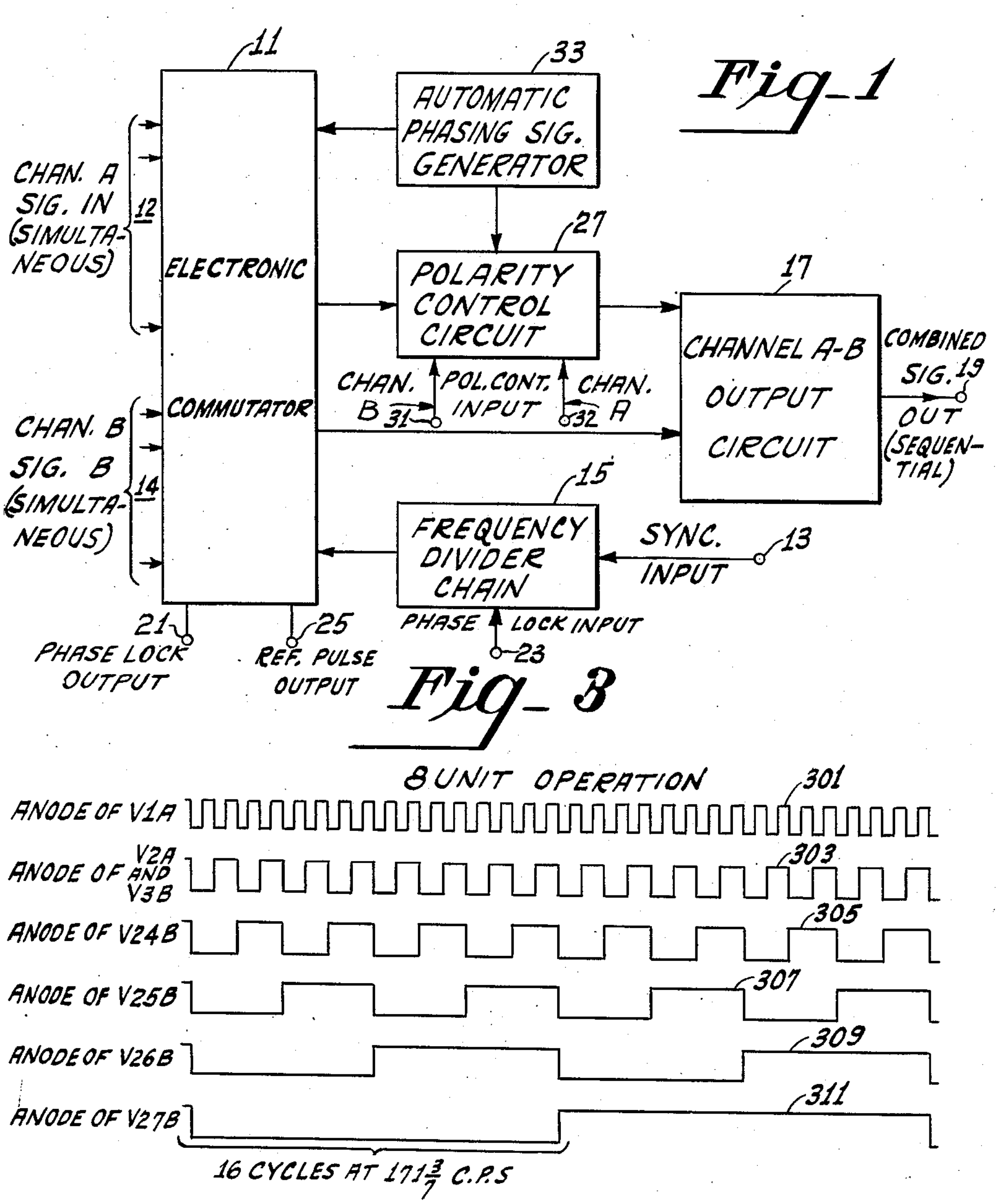

The invention relates to multiplex telegraph systems and particularly to electronic transmitting diplex distributor arrangements for such systems.

Essentially, a diplex transmitter is a distributor for converting a plurality of separately and simultaneously presented multi-element fixed-length code signals into an aggregated serial signal in which the individual code signal elements appear sequentially in time. As used hereinafter, a separate signal is construed to mean an $n$-element signal appearing over $n$ separate circuits with the elements presented simultaneously or sequentially element after element. An $n$-element simultaneous signal is construed to be one in which $n$ signal elements appear simultaneously on $n$ separate circuits, and a sequential signal is construed to be one in which $n$ elements appear on $n$ separate circuits element after element. A serial signal is construed to mean an $n$-element signal appearing element after element over a single circuit. A circuit arrangement for transposing from serial representation to a separate presentation is referred to by those skilled in the art as a ser-sep arrangement. Similarly, circuit arrangements limited to serial and simultaneous presentations are familiarly termed ser-sim arrangements, and circuit arrangements specifically limited to serial and sequential presentation are familiarly called ser-seq arrangements. Prior art arrangements for mechanically performing this function are known.

These prior art diplex transmitting distributors are wholly mechanical in nature, including electric motors, mechanical commutators, distributors, relays and associated components of like construction. The many of the manufactured components of such mechanical systems are specially designed. Such systems inherently call for experienced and involved procedures for maintenance of the commutator brushes, relay contacts, commutator segments and so forth.

A system of multiplex telegraphy now receiving considerable attention involves a plurality of telegraph channels transmitting in one direction between two stations and a like number of channels transmitting in the opposite direction. Normally transmission takes place simultaneously in both directions and, to a great extent, independently as well. Circuitry is provided in each channel at the receiving station to check the incoming signals for possible mutilation of the individual characters. This circuitry is so arranged that upon receiving a mutilated character in one receiving channel, transmission is halted in an associated transmitting channel and a signal requesting repetition of the character mutilated is transmitted to the other station. At this other station the receiving circuitry causes the transmitting channel in question to repeat the character under consideration. Such systems efficaciously may use transmitting (and receiving) diplex distributors of the type herein described. Preferably, the improved diplex distributor of the invention is used to control or coordinate the functioning of the component parts of the overall system. The diplex distributor may incorporate circuitry which is not essential to the diplex function in and of itself but which is necessary to the proper operation of the overall system.

It is an object of the invention to provide a transmitting diplex distributor comprising only readily available, general purpose electronic components.

It is a further object of the invention to provide a transmitter diplex distributor that is simple in operation and which does not require involved procedures for operation and maintenance.

A more specific object of the invention is to provide an electronic diplex transmitting distributor arrangement incorporating means to reverse the polarity of the output signal corresponding to either or both of the input signals in response to a simple switching operation.

A further specific object of the invention is to obtain a substantially constant amplitude output signal from an electronic diplex transmitting distributor circuit arrangement despite wide variation in amplitude of the input signals.

These and other objects of the invention are attained in an all electronic circuit arrangement including an electronic commutator wired as to form a signal element gating arrangement for a plurality of channel signal input codes of any given number of elements each. These signal elements are presented to the diplex transmitting distributor simultaneously over a plurality of leads and are to be presented in serial form to the multiplex transmitter in sequential order over a single lead. The electronic commutator is arranged to operate in response to a plurality of timing waves harmonically related to a standard reference frequency wave available at the station. The timing waves are permutated between gating control and gating tubes of the commutator to effect sequential sampling of each of the individual elements of the channels. The sampled elements are then serially applied over a single lead to a signal regenerating circuit.

A phase lock pulse output at a particular phase of the electronic commutator is provided for insuring that a signal element of one channel is followed by the proper signal element for the other channel in the total aggregation. Means also are provided to lock the electronic commutator of one diplex transmitter in phase with the commutator of another diplex transmitter supplying this phase lock information. Another reference pulse output is provided for application to a receiving diplex distributor located at the same terminal for use in measuring the circuit loop time of a looped two-way circuit.

A polarity control circuit is also incorporated to automatically invert the conditions of output signal corresponding to mark and space where it is desired to depart from the assigned marking and spacing polarities of one or both channels. A phasing circuit is arranged to put a preassigned code group on one channel regardless of the channel signal input code groups by throwing a switch. The phasing circuit is also arranged to control the polarity control circuit regardless of input information so that the phasing signal output consists of a predetermined code group of predetermined polarity.

Figure 2A:
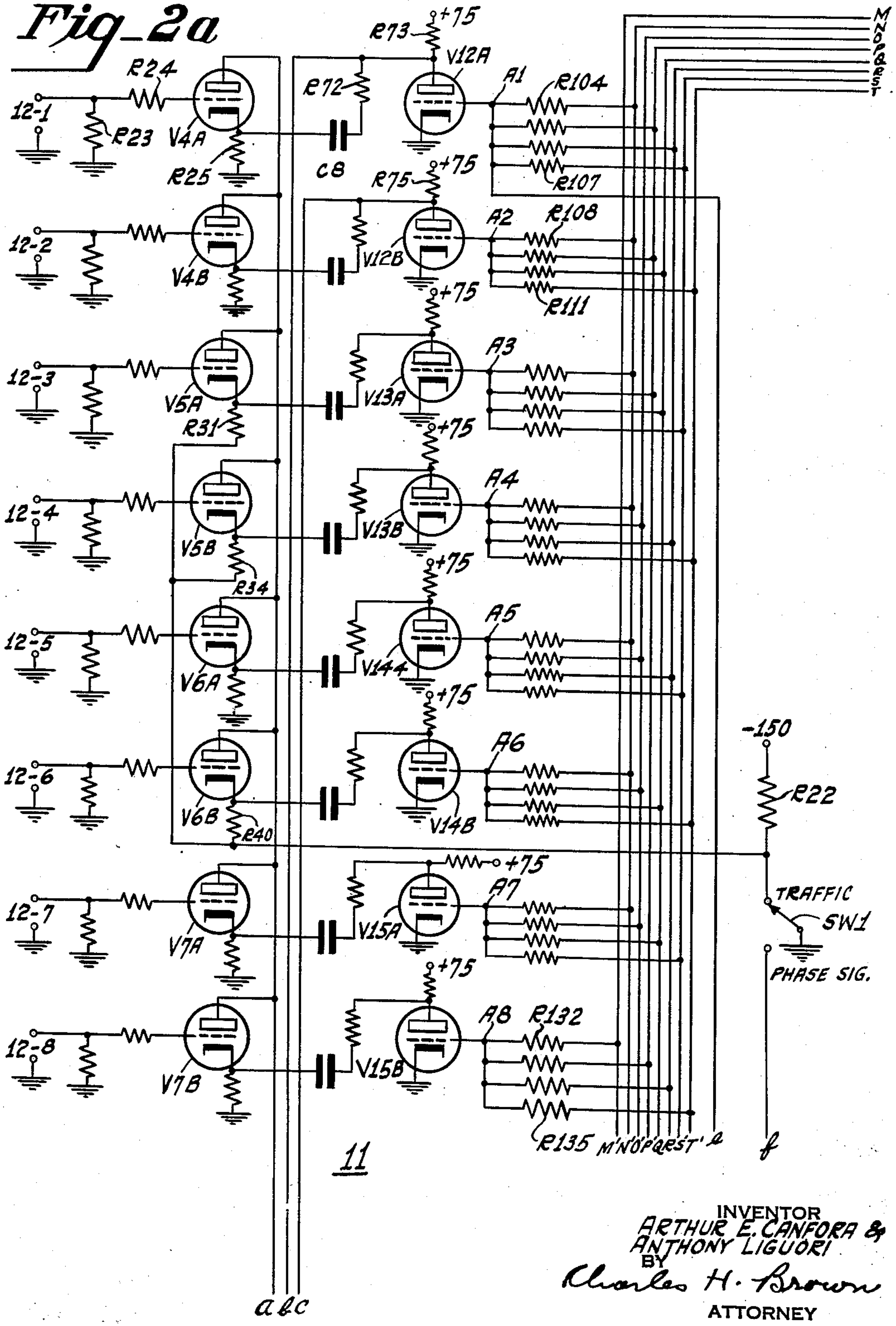
Figure 2B:
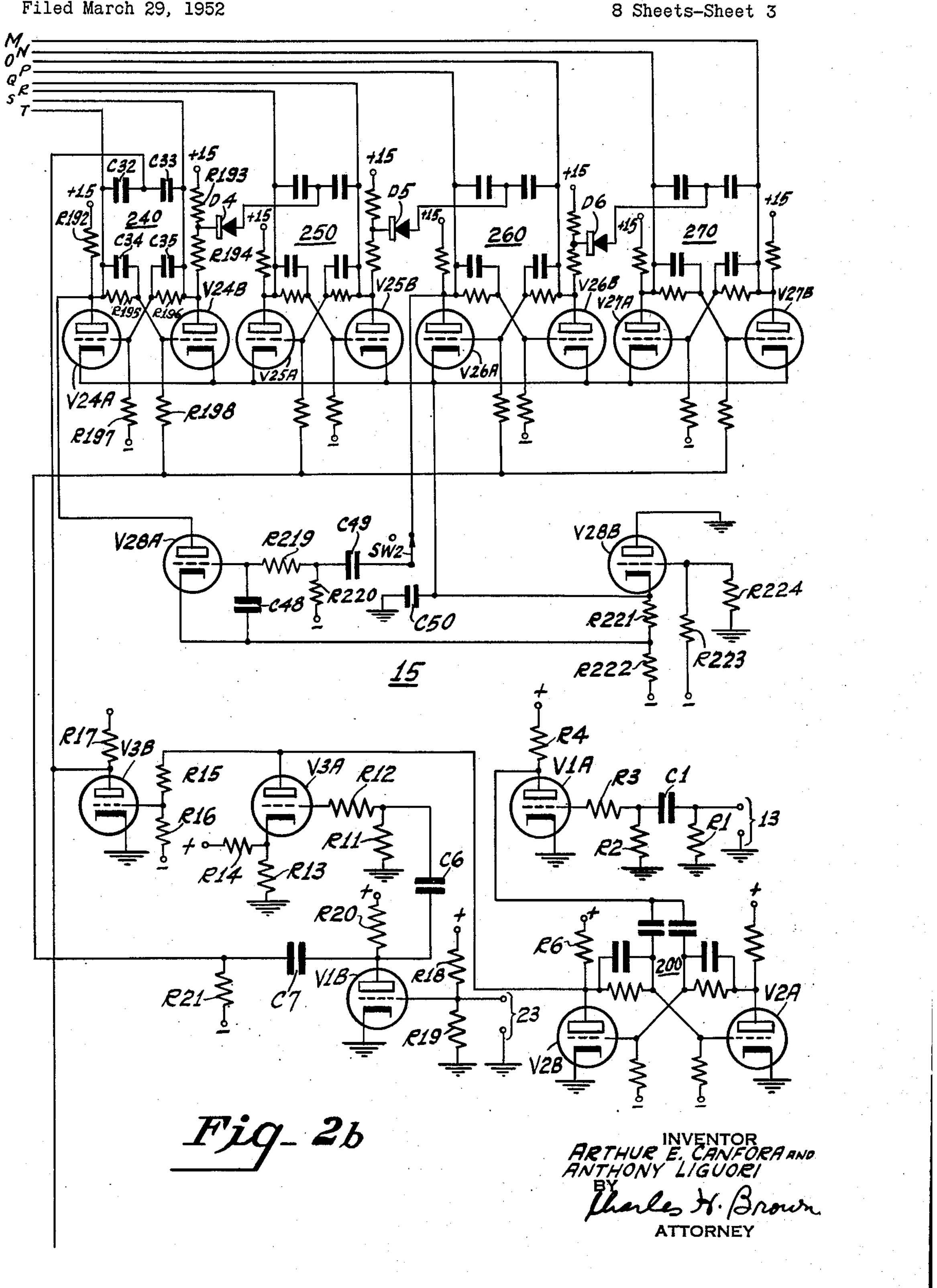
Figure 2D:
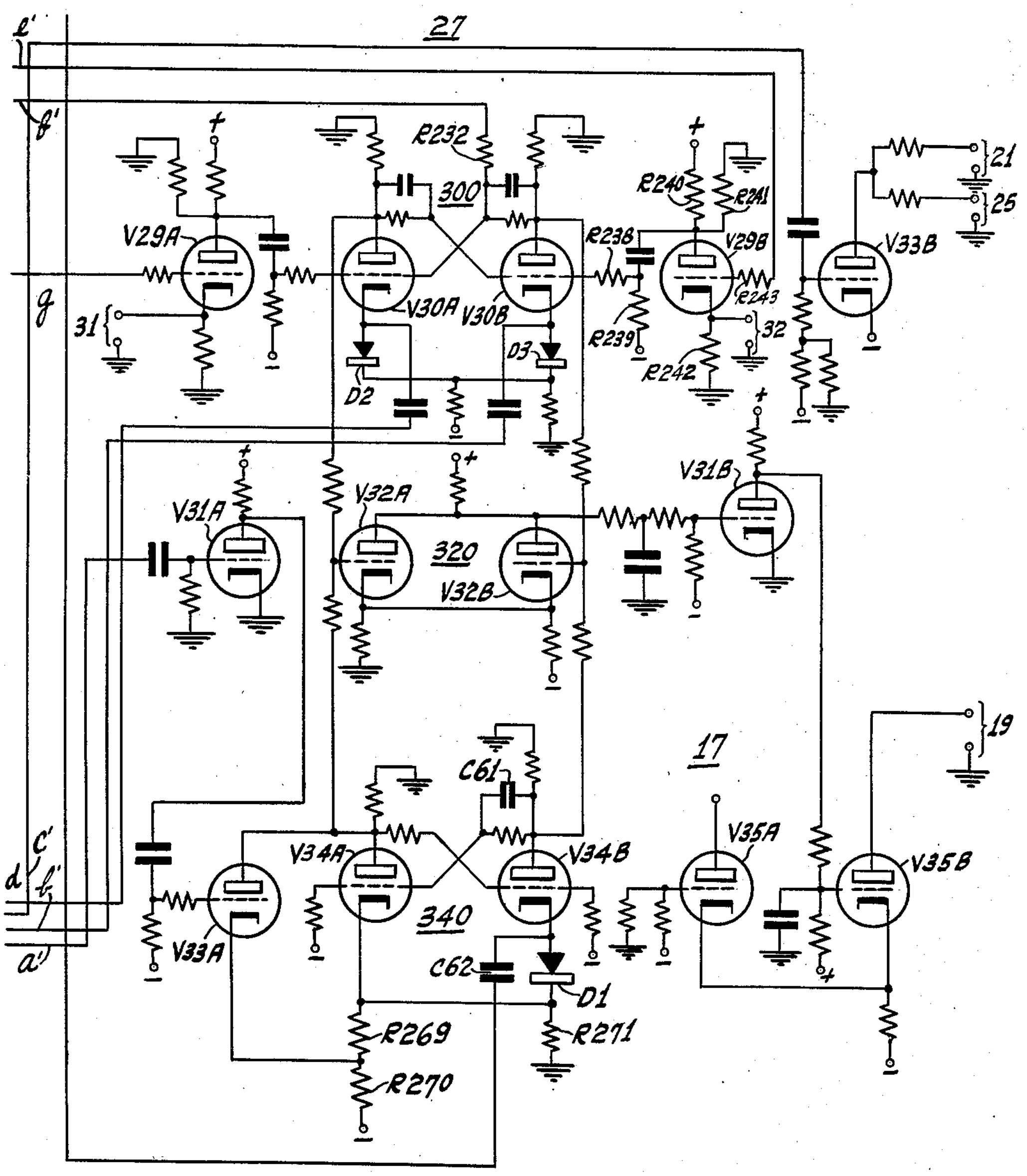

An example of apparatus according to the invention will be described in detail with reference to the accompanying drawing forming a part of the specification and in which:

Fig. 1 is a functional block diagram of a diplex transmitting distributor according to the invention;

Fig. 2 (Figs. 2*a*, 2*b*, 2*c* and 2*d* being taken together) is a schematic diagram of a circuit arrangement functioning according to the invention as outlined by the block diagram of Fig. 1; and Figs. 3–9 are curves representative of the waveforms produced at various points of the circuit arrangement shown schematically in Fig. 2.

Referring to Fig. 1 there is shown a functional block diagram of a diplex transmitting distributor according to the invention. An electronic commutator 11 is so wired as to form a commutated gating arrangement for the channel A and B signal inputs at terminal groups 12 and 14 respectively. The distributor according to the invention may be used with codes of any number of elements but the circuits shown and described in detail were designed for a code of the seven unit protected variety in which each character is represented by three marking and four spacing signal elements. These seven elements are presented to the diplex transmitting distributor separately and simultaneously over seven leads and are to be presented to the electronic multiplex transmitter with which this circuit is designed to operate in serial order over one lead. Further details of such an electronic multiplex transmitter are given in the copending U. S. patent application Serial No. 211,272 filed February 16, 1951 (RCA 33,781) of E. R. Shenk, A. Liguori and A. E. Canfora. The electronic commutator is arranged to operate in response to a plurality of timing waves harmonically related to an input frequency wave derived from the electronic multiplex transmitter and applied at terminals 13 to a frequency divided chain 15. The timing waves are permutated between gating control and gating tubes to effect sampling of each of the seven elements of channel A sequentially, the seven elements of channel B being presented to the circuit simultaneously, and then effect sampling of the channel B elements while the A elements are still being presented to the circuit. The sampled elements are serially applied over a single lead to an A and B channel output circuit 17 which shapes the signal and provides the desired output level for a given load impedance at terminals 19.

The diplex transmitting distributor according to the invention also provides the auxiliary functions for proper operation of the system as a whole. For four channels of seven unit operation, two diplexers will be necessary, one for the A and B channels and one for the C and D channels. The four channels are presented to the electronic multiplex transmitter in pairs, that is, A and B over one lead and C and D over another lead. The electronic multiplex transmitter in turn combines the signals from the two leads into an aggregate signal over one lead, preferably in the aggregation:

$$A_1C_1A_2C_2A_3C_3A_4C_4A_5C_5A_6C_6A_7C_7 \quad B_1D_1B_2D_2B_3D_3B_4D_4B_5D_5B_6D_6B_7D_7$$

This aggregation is termed a sequentially interleaved aggregation. It is construed as sequential because each diplex signal in itself consists of elements $A_1$ through $A_7$ followed by elements $B_1$ through $B_7$ for one diplex transmitter and elements $C_1$ through $C_7$ followed by elements $D_1$ through $D_7$ for the other diplex transmitter. It is stated to be interleaved because each channel of a diplex transmitter presents the signal elements thereof alternately with a channel from the other diplex transmitter. The diplex transmitters must provide the means for insuring that channel $A_1$ signal element is followed by the channel $C_1$ signal element in the total aggregation. This is accomplished by providing a phase lock output, at terminals 21 which consists of a pulse output at a particultr phase of the electronic commutator 11. The diplex transmitter is also able to receive this pulse, at terminals 23, and lock the electronic commutator in phase with the commutator of the diplex transmitter supplying this phase lock information. Thus, if two diplex units are used, the AB diplex transmitter will be the superior and the CD diplex transmitter will be subordinate to it.

The diplex transmitter according to the invention also provides another pulse output identical to the one just discussed but which serves another function. This reference pulse output, at terminals 25, is applied to a receiving diplex distributor located at the same terminal and is used there to measure the circuit loop time between two transmitting and two receiving diplex distributors providing two-way circuits such as those previously described.

It is conventional in telegraph signalling systems to make the marking polarity of one channel the spacing polarity of another channel. A polarity control circuit 27 is connected to automatically invert the conditions of mark and space between the two channels. If it is desired to depart from the assigned marking and spacing polarities of one or both channels, information to do so is presented to the proper polarity control input terminals 31 or 32 of the polarity control circuit 27 and the polarity control circuit 27 is caused to ignore the pre-assigned convention and deliver the signal polarities called for by the polarity control information.

A companion receiving diplex distributor is so designed that by pushing a button at the receiver and throwing a switch on the diplex transmitting distributor, the electronic commutators of both units can be set in phase, a condition necessary to any type of time division multiplex operation. By throwing a switch on the diplex transmitting distributor, a phasing signal generator 33 puts a preassigned code group on channel A regardless of the channel A signal input code groups. The phasing signal generator 33 puts a preassigned code group on channel A regardless of the channel A signal input code groups. The phasing signal generator 33 also takes control of the polarity control circuit regardless of polarity control input information with the result that the channel A output consists of a predetermined code group of predetermined polarity as long as the phasing switch is in the phase adjusting position.

The frequency divider chain 15 preferably has a switch incorporated in the circuit to alter the overall division so that eight unit code may be used if it is desired without making any other changes in the circuit arrangement.

*Timing wave generator*

Referring to Figs. 2*a* to 2*d*, there is shown a schematic diagram of an embodiment of the diplex transmitter according to the invention. The timing wave generator 15, shown in Fig. 2*b*, comprises a conventional frequency dividing chain of amplifiers and bistable reciproconductive circuits triggered by a synchronizing square wave, obtained from a frequency standard directly or indirectly through one of the associated components as available.

As employed herein the term "reciproconductive circuit" is construed to include all two tube regenerative devices in which conduction alternates in one or the other tube in response to applied triggering potential. The term "multivibrator" is sometimes applied to this circuit and the term "locking circuit" is sometimes applied to a bistable reciproconductive circuit, which is one in which two triggers are required to switch from one stable state to the other and return. A preamplifier tube V1A, shown in Fig. 2*b*, and associated components produce a differentiated square wave which is impressed on both grids of a reciproconductive circuit comprising tubes V2A and V2B to provide a square wave of 85$\frac{5}{7}$ cycles per second. This wave is applied to the succeeding dividers by way of an isolating tube V3B. Eight tubes V24-V27B are connected in a known ring circuit to divide this frequency by a factor of fourteen when a division factor switch SW2 is in one position and by a factor of sixteen when the switch is in the other position. The ring circuit shown is essentially a conventional Eccles-Jordan circuit with the tube V28A as the feedback path for division by fourteen and the tube V28B as a voltage regulator device to provide the proper cathode voltage for these frequency dividers. The grid of one tube of each of the last four reciproconductive circuits returns to −150 through a common resistor R21, for the purpose of locking the commutator 11 in a preassigned phase relationship with another identical unit for four channel operation, as will be explained later.

Figures 4, 5, 6:
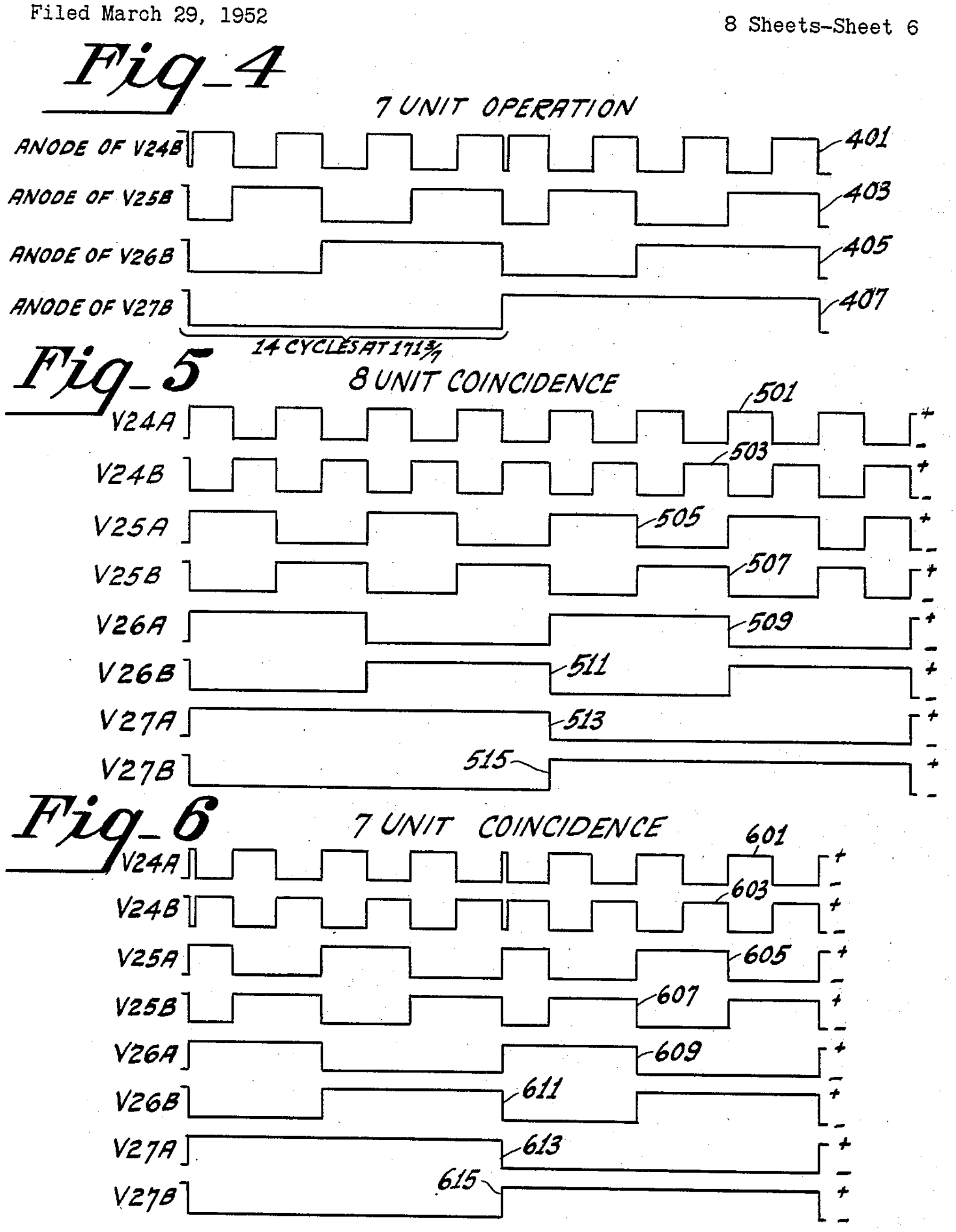

The curves 301—311 in Fig. 3 show the various waveforms at pertinent points of the divider chain for the eight unit operation and the curves 401—407 in Fig. 4 show the waveforms which differ for the seven unit operation. A companion of Figs. 3 and 4 illustrates the difference in "shaft" speed of an analogous mechanical arrangement or "electronic commutation" speed between the seven and eight unit operation. The voltage wave produced at tubes V27A and V27B is equal to the "speed of rotation" of an analogous mechanical device and these speeds are $$\frac{171\frac{3}{7}}{28}=6\frac{6}{49}$$

cycles of revolutions per second for the seven unit case and $$\frac{171\frac{3}{7}}{32}=5\frac{5}{14}$$

cycles or revolutions per second for the eight unit case.

*Electronic commutator*

Leads connected to the anodes of the tubes V24A—V27B, shown in Fig. 2*b*, are interconnected through individual isolating resistors R104—R167, shown in Figs. 2*a* and 2*c* to form sixteen coincidence points in such permutations that the voltage at one of these coincidence points is above ground potential for a given length of time only and is below a specified negative potential for the rest of the commutation period. This positive potential appears at each of the sixteen coincidence points in turn and constitutes the gating potential. Each of the sixteen points is tied to the grid of a coincidence gate controlling triode whose cathode is at ground potential. Thus the voltage at the anodes of tubes V12A—V19B will vary from +75 volts to approximately +10 volts and back to +75 volts. This will occur for each of the sixteen triodes in succeeding order for eight unit operation and for each of the fourteen triodes V12A—V15A, V16A—V19A for seven unit operation.

The curves 501—515 of Fig. 5 show the harmonically related waveforms of the anodes of the tubes in the counting chain and from these waveforms, one can determine the connections necessary to obtain the desired commutation for the eight unit case. It can be seen from this figure that the anodes corresponding to a particular signal element are all positive at only one time during the commutation cycle. At other times three of the four anodes may be positive but this condition still gives a negative voltage at the grids of the coincidence tubes V12A—V19B. Each of these tubes therefore conducts only $\frac{1}{16}$ of the total commutation time. It will also be noted that the maximum conducting time is governed by the reciproconductive circuit 240. This time is equal to ½ the period of the reciproconductive circuit 240 or 11.66 milliseconds at an operating speed corresponding to 85 C. P. S. This conduction time is the same whether seven or eight unit operation is used.

The same waveforms and coincidence connections for the seven unit operation are represented by the curves 601—615 in Fig. 6. For seven unit operation the coincidence connections are unaltered, a switch is thrown to include the reset operation from the tube V26A to the tube V24A. The channel signal element scanning sequence is unaltered except for the fact that the points A8 and B8 are never positive. The A8 coincidence connections are made through the resistors R132, R133, R134 and R135 to the anodes of the tubes V24A, V25A, V26A and V27B, respectively. A study of Fig. 6 shows that these anodes are never simultaneously positive. The B8 coincidence connections are made through resistors R164, R165 R166 and R167 to the anodes of the tubes V24A, V25A, V26A and V27A, respectively. From the curves of Fig. 6 it can be seen that these anodes are never simultaneously positive either. Therefore, the grids of the sampling or gating control tubes V15B and V19B never go positive on seven unit operation and consequently the corresponding anodes undergo no voltage change. This means that for seven unit operation the conduction of the tube V19A is followed by the conduction of the tube V12A instead of the tube V19B and the conduction of the tube V15A is followed by the conduction of the tube V16A instead of the tube V15B thus eliminating two "commutator segments," one for the A channel and one for the B channel, leaving a total of fourteen "segments."

The mode of operation which provides a single train of signals from the A and B channel signals will be described for the seven unit protected code which consists of three marking elements and four spacing elements per character.

Seven signal elements from a single source, for example a tape operated transmitting distributor, are presented simultaneously, one to each of the seven input terminals 12—1 to 12—7 of identical characteristics provided for channel A. Assume a code group is presented to channel A inputs composed of signal elements 3, 4 and 6 marking and elements 1, 2, 5 and 7 spacing. This means that terminals 12—3, 12—4 and 12—6 are at zero potential and hence the grids of tubes V5A, V5B, and V6B are at ground potential. The terminals 12—1, 12—2, 12—5 and 12—7 will be at —20 volts with respect to ground, thus causing the grids of the tubes V4A, V4B, V6A and V7A to be —20 volts also. When the coincidence sampling or gating control tube V12A conducts, the negative transition is differentiated in the circuit comprising a capacitor C8 and the associated resistors to form a negative pulse at the cathode of the tube V4A. This pulse amplitude is less than the —20 volt signal bias on the grid of the tube V4A and therefore the common anode load resistor R71 remains at ground potential. Under control of the divider tubes V24A to V27B, the sampling tube V12A ceases to conduct and the sampling tube V12B conducts in the required sequence at the signal character rate and a negative pulse appears at the cathode of the tube V4B. This tube is also cut off by the applied spacing signal so that no pulse appears across the load resistor R71. The negative pulse at the cathode of the tube V5A due to conduction of the tube V13A appears across the anode load resistor R71, because the grid of tube V5A is at ground potential due to applied marking signal. The tube V5A acts somewhat as a diode allowing a negative pulse at the cathode to appear at the anode. The negative pulses will appear across the load resistor R71 through the tubes V5B and V6B when the tubes V13B and V14B conduct, due to signal conditions. No pulses appear through the tubes V6A and V7A when the tubes V14A and V15A conduct due to the channel A signal code group applied.

*Signal element regenerator*

These negative pulses occurring in time relationship across the load resistor R71 are inverted and amplified in an inverter tube V31A and fed to the grid of a regenerator control tube V33A which is biased below cutoff by means of resistors R269 and R270. The anode of the control tube V33A is connected to one side of a bistable reciproconductive circuit 340 comprising cross-connected triode tubes V34A and V34B. This circuit is essentially a pulse signal regenerator. In the cathode of the tube V34B negative pulses are developed through a differentiating capacitor C62 and the back resistance of a unilateral impedance element shown here as a germanium diode D1. These negative pulses are relatively narrow and are applied at signal element rate to coincidence with the appearance of signal derived pulses on the grid of the control tube V33A. Both of these pulses tend to control the signal regenerator circuit 340, but the pulses in the cathode of tube V34B will control only in the absence of signal derived pulses at the grid of the control tube V33A. The pulses from tube V33A when present as determined by the signal conditions will control the conducting state of the signal regenerating circuit 340 by virtue of being greater in width.

*Signal polarity reversing*

Figure 7:
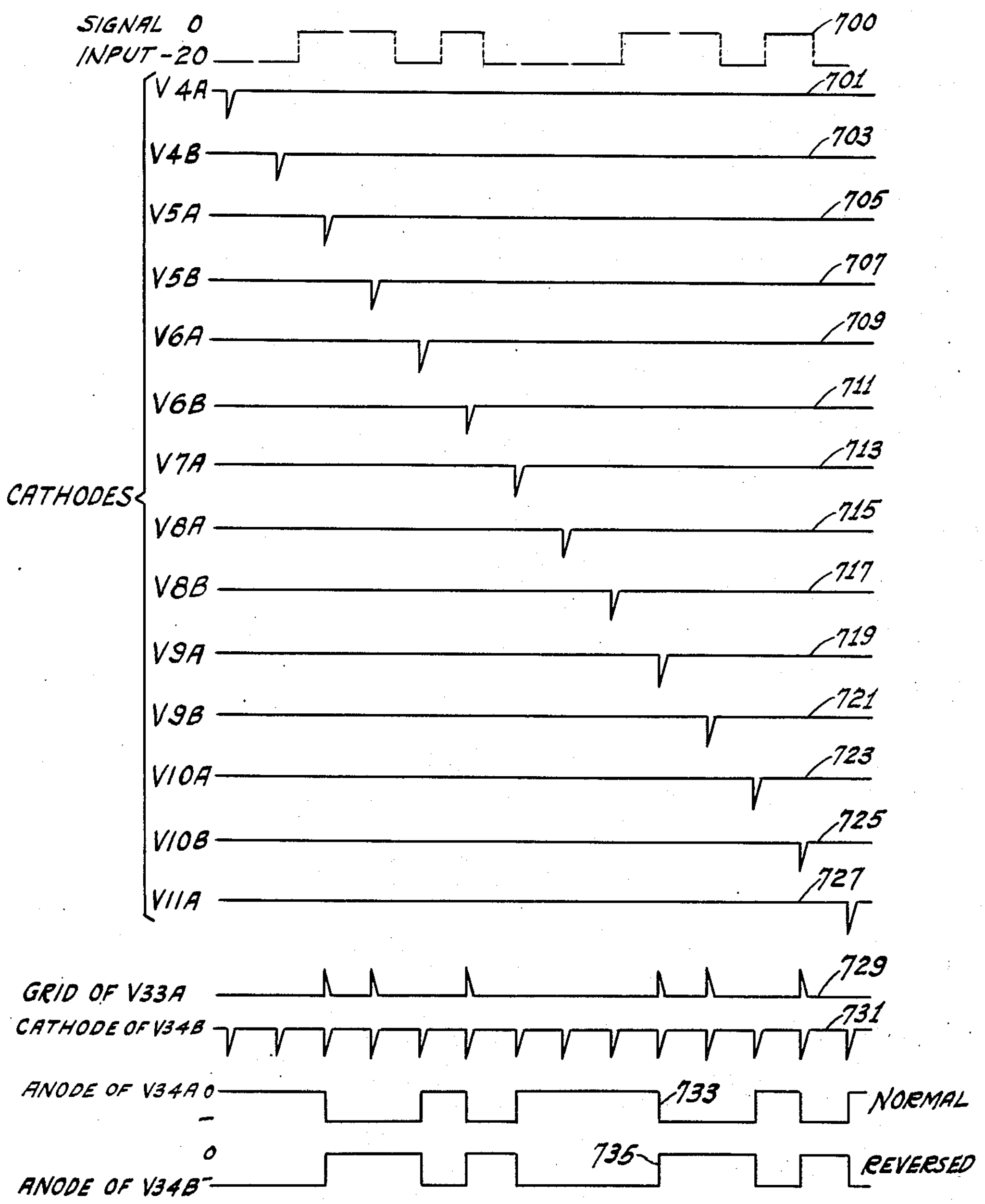
Figure 8:
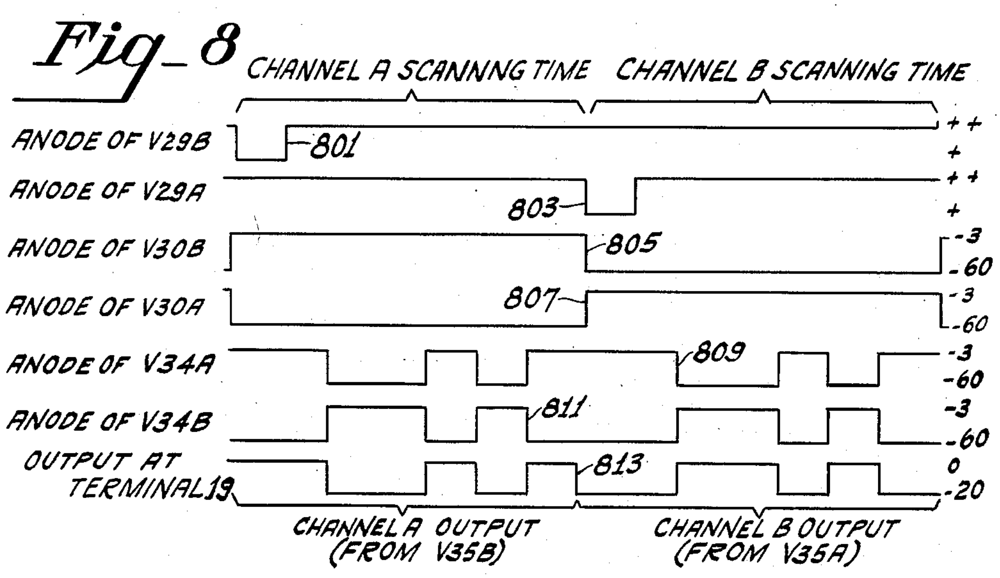

It it conventional operating practice to reverse the polarity of signal elements on adjacent channels. In the arrangement disclosed this polarity reversal is automatically made as the signal scanning proceeds from elements $A_7$ to $B_1$ as described below. Assume the channel B signal input terminals 14—1 to 14—7 receive the same code group as was assumed above for channel A. Pulses will appear across the load resistor R71 and consequently on the grid of the control tube V33A, shown in Fig. 2*d*, at the times when the corresponding gating tubes V17A, V17B and V18B conduct. The signal regenerator circuit 340 will respond exactly as for the scanning of the channel A signals. Referring to Fig. 7, an example of input signal is represented by curve 700, curves 701—727 show the phase relationship of pulses formed at the cathode electrodes of gating tubes V4A—V11A and curves 729 and 731 represent the pulses presented at the grid of the tube V33A and at the cathode of the tube V34B in response to the signal shown in curve 700. Curves 733 and 735 show the resultant direct and indirect output signal trains corresponding to the input signal represented by the curve 701. By taking the output signal from either the anode of tube V34A or V34B, the signal regenerator circuit 340 will provide signals of either polarity to permit one signal polarity to be used for channel A and the opposite polarity for channel B. A marking element is defined thus far as zero voltage signal input and a spacing element as —20 volts input for both channels A and B. The output marking element for channel A at the output terminals 19 is chosen to be —20 volts and the spacing element as zero volts across a 10,000 ohm input resistor (not shown). This is termed "normal" polarity for channel A. For channel B the exact reverse is desired, that is the marking element at terminals 19 is chosen to be zero volts and the spacing element as —20 volts. This is termed "normal" polarity for channel B. Channel A zero input must appear as —20 volts in the output while zero input to any of the channel B input terminals must appear as zero output voltage and —20 volts input for channel A must appear as zero volts in the output while —20 volts for channel B input must appear as —20 volts in the output.

The anode of the tube V34B is at its higher potential for a marking signal element input. Tracing the inversions involved in passage through the tubes V32B, V31B and V35B, it will be seen that the output for mark through this circuit path is the lower of the two possible output potentials from the tube V35B, that is —20 volts. The anode of the tube V34A is at its lower potential for a marking signal element input.

Tracing the inversions involved in passage through the tubes V32A, V31B and V35B, it will be seen that the output for mark through this circuit path is the higher of the two possible output potentials from tube V35B, that is zero volts. It is necessary, therefore, to block the path through the electronic switch tube V32A while the electronic commutator 11 scans the channel A signal inputs and then to block the path through the switch tube V32B while the commutator 11 scans the channel B signal inputs. The signal polarity control circuit 300, comprising a bistable reciproconductive circuit 300 consisting of tubes V30A and V30B in conjunction with two polarity reversing tubes V29A and V29B automatically accomplishes this signal reversing process. The voltage at the anodes of the polarity control circuit 300 and the signal regenerator circuit 340 is either −60 volts or approximately −3 volts. Assuming the anode of the tube V30A to be at −60 volts, the voltage at the grid of the tube V32A is either −60 or −30 volts approximately, depending on the state of the signal regenerator circuit 340. The cathode of the switch tube V32A is biased to about −8 volts and therefore when the tube V30A is conducting the signal path through the switch tube V32A is blocked. In this case, with the tube V30B blocked the voltage at the grid of the switch tube V32B is either −30 or −3 volts approximately, depending on the state of the signal regenerator circuit 340. It is seen that the signal can be passed through the switch tube V32B depending on signal conditions at the input terminals 12. When the tube V30B is conducting, the polarity control circuit 300 then blocks the path through the switch tube V32B and opens the path through the other switch tube V32A. The locking circuit 300 must therefore have the tube V30B blocked during the channel A scanning period and the tube V30A blocked during the channel B scanning period. The grid of the polarity reversing tube V29B is tied to the channel A1 coincidence point, that is at the junction of the resistors R104, R105, R106 and R107. At the start of channel A scanning this point becomes positive. The reversing tube V29B therefore becomes conducting and produces a negative going pulse which is impressed on the grid of the tube V30B to block it. This allows the applied signal elements from the anode of the tube V34B of the signal regenerator circuit 340 to be used. Coincidence points A1, A2, A5 and A7 are at ground potential and coincidence points A3, A4 and A6 are at a voltage of −20 volts. At the end of the channel A scan, the grid of the reversing tube V29A which is tied to the coincidence point B1, at the junction of resistors R136, R137, R138 and R139 becomes positive and the tube V29A conducts. This negative going voltage is impressed upon the grid of the tube V30A blocking it. Under these conditions the opposite phase of the signal is obtained from the signal regenerator circuit 340. The corresponding elements of the B channel output are then the reverse of the A channel, as desired. The operation of the signal polarity reversing circuitry is illustrated by curves 801—813 of Fig. 8.

In some applications it may be desired to depart from the preassigned marking and spacing output polarities for channel A or B or for both simultaneously. This is accomplished by applying an external control voltage to the polarity reversing tubes. The external control circuitry is the same for both channels and hence only the channel A control will be described.

At the instant that the grid of polarity reversing tube V29B becomes positive to trigger the polarity control circuit 300 to put normal polarity signals on channel A, a negative pulse appears at the cathode of the tube V30B from the anode of the gating control tube V12A to attempt to trigger the polarity control circuit 300 to reverse the polarity of the signals on channel A. This pulse is normally overcome by the normal controlling wave from the reversing tube V29B. To make it effective, prior to the generation of the pulse at the anode of the reversing tube V29B, a positive voltage of +20 volts is developed across a resistor R242 in the cathode of the tube V29B from the external controlling source connected to terminals 32. Since the grid of the reversing tube V29B will only become 0 volts, the cathode voltage of the tube V29B of +20 volts will not render the tube conducting as it would have normally. This allows the pulse in the cathode of the tube V30B to cause it to conduct during the channel A scan instead of blocking it as it would have otherwise. If the +20 volts is supplied to the terminal 32 permanently the channel A output signals will be reversed and likewise the channel B signals will be reversed on application of potential to the terminals 31.

*Phasing signal generator*

A special phasing signal was mentioned as being required on the A channel output for receiving equipment phasing purposes. This signal in practice is the same as that assumed previously for purposes of circuit explanation, that is signal elements 3, 4 and 6 of channel A marking and this signal should always be of normal polarity.

This is accomplished by throwing a switch SW1 to the "phasing" position. In so doing, resistors R31, R34 and R40 are removed from ground and tied to −150 volts through a resistor R22. This clamps the grids of the tubes V5A, V5B and V6B to the respective cathodes. Since the cathodes of these tubes return to −150 volts through the resistor R22, the cathodes will be at about −35 volts even if the signal voltage on these grids is −20 volts.

With the grids at zero or −20 volts, these tubes will act as diodes for the respective commutating pulses and consequently the A3, A4 and A6 commutating pulses will appear across the load resistor R71 and ultimately control the signal regenerator circuit 340 and output signal regardless of the channel A input signals. The plates of the tubes V4A—V7B will also be at −35 volts and since the cathodes of the tubes V4A, V4B, V6A and V7A are at ground potential, these tubes cannot conduct at any time regardless of channel A signal conditions. The net effect is the same as putting the desired signal code at the channel A input terminals 12 but without having to resort to any specially coded tape insertion at the tape transmitter. The normal nature of this phasing signal is assured by divorcing the polarity control circuit 300 from both the internal and external controls. Throwing the switch SW1 to the phasing position connects the grid of the tube V30A to ground through a resistor R232. This action destroys the locking effect of the circuit 300 and maintains the anode of the tube V30B at the potential required for normal signal operation of channel A. Since the anodes of tubes V8A—V11B are all tied together to the load resistor R71, these tubes cannot respond to the channel B signal inputs because the anodes are at −35 volts while the respective cathodes are at ground. This condition gives a steady output at terminals 19 of zero volts during the channel B scanning period. The above feature insures against any possibility of having the desired phasing signal appear inadvertently in the B channel output signal train.

Four channel operation involving two diplex transmitting distributors requires that the commutators of both distributors be locked in a definite phase relationship in order to maintain the four channel signal aggregation outlined earlier. Each diplex distributor produces two similar pulse outputs at terminals 21 and 25. One of these outputs is used to indicate total loop time between a transmitting and receiving diplex by comparing the phase difference between these diplex units in the receiving diplex distributor. The other output is fed to the channel CD transmitting diplex distributor to lock it in the required phase relationship. This output is a positive going or zero volt rectangular pulse equal in length to one segment time or at one speed of operation, 11.66 milliseconds. When the tube V12B conducts, the anode potential drop across the anode resistor R75 is brought out to the grid of a phasing pulse output tube V33B which is normally conducting and giving an output of −20 volts in 10,000 ohms at the output terminals 21 and 25 when properly terminated. The negative pulse impressed upon the grid of the output tube V33B blocks the tube for 11.66 milliseconds, giving zero output voltage during this time. Each unit is provided with phase lock input terminals 23. When used as an AB channel diplex transmitter phase lock information pulses from an associated diplex receiver are applied to terminals 23. When a diplex transmitter is operating on CD channel the above described phase lock pulses from the AB channel diplex transmitters are applied to terminals 23. This information is used to reset each of the five reciproconductive circuits in the frequency divider chain 15 to the proper conducting state at the time the unit supplying this phase lock pulse is in the process of scanning the $A_2$ signal element. This reset operation need occur only when the first phase lock pulse arrives. Since the speeds of both commutators are identical, at the next scan of $A_2$ of the AB diplex unit, the CD diplex commutator will already be in the correct scanning position.

Figure 9:
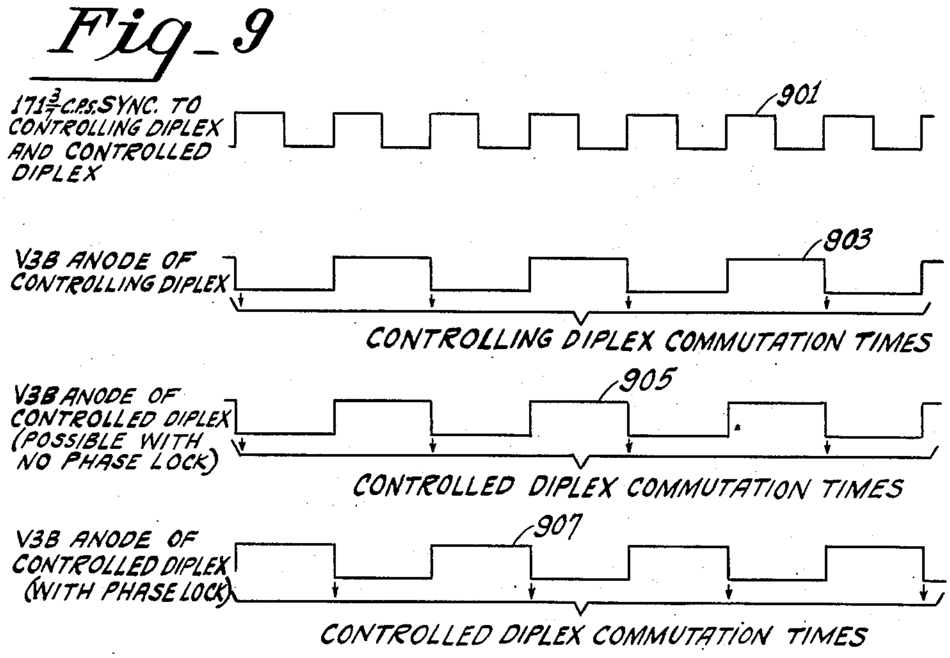

The actual reset operation is as follows. When the phase lock pulse arrives, the grid of the gating control tube V16A should be positive. If it is not already positive, the four divider tubes V24B, V25A, V26A and V27B, shown in Fig. 2b, are blocked by the phase lock pulse. These tubes have the anodes tied to the grid of the tube V16A and the grids are returned to −150 volts through the respective grid resistors and a common resistor R21, shown in Fig. 2b, instead of to −150 volts directly. The phase locking input amplifier tube V1B is normally blocked and the phase lock pulse will make it conduct. The negative going transition of the anode of the tube V1B is differentiated by a capacitor C7 and the resistor R21 so that the grids of the divider tubes V24B, V25A, V26A and V27B receive a negative pulse by way of the resistor R21 and block the corresponding tubes. The phasing of the commutators is thus fixed with respect to each other. The input reciproconductive circuit 200 must be in a certain state of conduction upon the arrival of the phase lock pulse. If it does not, it is reset to this state in the following manner. At the end of the phase lock pulse the reset tube V1B is blocked. The positive transition occurring at this time is differentiated by the circuit comprising a capacitor C6, and resistors R11, R12 and R20 to give a positive pulse at the grid of the tube V3A. This positive pulse causes the tube V3A to conduct through the anode load resistor R6 causing the tube V2B to conduct. This is the desired state of conduction for the circuit 200 upon arrival of the phase lock pulse. The preceding operation on the circuit 200 puts it 180 degrees out of phase with respect to the corresponding reciproconductive circuit in the superior diplex transmitter. This insures that the commutation of one diplex unit occurs midway between the commutation of the other unit, which mode of operation is essential to proper signal aggregation. The curves 901—905 of Fig. 9 shows the in line commutation times possible in both diplex units if no phase lock is used. This is an undesired condition. The curve 907 illustrates the desired condition obtainable with phase lock control.

The transmitting diplex units described may be used as a source of "local timing pulses" at specified phases of the commutator if desired. These are obtained by tying the grids of pulse output amplifier tubes to the appropriate coincidence junction points A1 to A16 as desired. These output pulses may be used for timing the local equipment associated with the system.

The following component part values were used in construction of an electronic diplex transmitting distributor as shown in Fig. 2 and described in the foregoing specification for an operating speed of 85 C. P. S. corresponding to a 50 baud channel speed. Obviously, other values may be employed for other channel speeds and so forth.

*Capacitors*

| Reference No.: | Value |
|---|---|
| C1 | 0.05 mfd. |
| C6 | 0.0005 |
| C7 | 0.0015 |
| C8 | 0.005 |
| C32, C33, C34, C35, C48 | 0.0001 |
| C49 | 0.0002 |
| C50 | 0.05 |
| C62 | 0.0002 |

*Resistors*

| | |
|---|---|
| R1 | 10 kilohms |
| R2 | 1 megohm |
| R3 | 100 kilohms |
| R4 | 500 kilohms |
| R6 | 150 kilohms |
| R11 | 1.2 megohms |
| R12 | 1 megohm |
| R13 | 16 kilohms |
| R14 | 82 kilohms |
| R15 | 1 megohm |
| R16 | 2 megohms |
| R17 | 1.2 megohms |
| R18 | 430 kilohms |
| R19 | 10 kilohms |
| R20 | 560 kilohms |
| R21 | 27 kilohms |
| R22—R24 | 100 kilohms |
| R25 | 22 kilohms |
| R31, R34, R40 | 22 kilohms |
| R71 | 1 megohm |
| R72 | 100 kilohms |
| R73, R75 | 560 kilohms |
| R104—R167 | 4.7 megohms |
| R192 | 75 kilohms |

*Resistors*—Continued

| Reference No. | Value |
|---|---|
| R193 | 33 kilohms |
| R194 | 43 kilohms |
| R195—R196 | 2 megohms |
| R197 | 1 megohm |
| R198 | 910 kilohms |
| R219—R220 | 1 megohm |
| R221—R222 | 2.7 kilohms |
| R223 | 330 kilohms |
| R224 | 1 megohm |
| R232 | 560 kilohms |
| R238—R239 | 1 megohm |
| R240—R241 | 2 megohms |
| R242 | 10 kilohms |
| R243 | 330 kilohms |
| R269 | 16 kilohms |
| R270 | 5.1 kilohms |

*Tubes*

| | |
|---|---|
| V1A—V35A | ½ Type 5963 |

*Diodes*

| | |
|---|---|
| D1—D6 | 1N34A germanium |

The electronic diplex transmitting distributor shown in the schematic diagram of Fig. 2 as actually built, operated from two electronically regulated power supplies. One power supply, having the negative terminal at ground potential, delivered +150 volts to all points marked + or +150, +75 volts to those points so indicated, and +15 volts to those points so indicated, with the total drain at approximately 26 milliamperes.

The other power supply, having the positive terminal at ground potential, delivered −150 volts at approximately 26 milliamperes at points marked − or −150.

The invention claimed is:

1. A multi-channel transmitting distributor system for translating multi-element, fixed-length code characters from separate and simultaneous form to serial form including a signal element regenerator comprising a reciproconductive circuit having at least one stable state of equilibrium and complementary output circuits, means to trigger said reciproconductive circuit to one state of equilibrium at signal element rate, means to apply pulses corresponding to signal elements of one nature to said reciproconductive circuit to trigger said circuit to the other state of equilibrium, whereby the output circuits of said reciproconductive circuit provide separate output signal trains of opposite polarity directly and indirectly representative of the input signals, an electronic switching circuit coupled to said signal element regenerator circuit, output terminals coupled to said switching circuit, said electronic switching circuit being arranged to connect said output terminals selectively to the complementary output circuits of said signal element regenerator circuit in response to applied switching potential, a bistable reciproconductive system coupled to said electronic switching circuit to develop and apply said switching potential, control circuits having complementary inputs connected to said reciproconductive system, means to apply pulses to said reciproconductive system at channel rate to trigger the same to alternate states of conduction, means to apply pulses to one of the inputs of said control circuit to reverse the triggering of said reciproconductive system, means to apply potential to the other of said inputs to nullify the application of the polarity reversing pulses, a gating circuit arranged to serially apply pulses indicative of applied input signal elements of said one nature to said reciproconductive circuit, and means to apply pulses derived from at least a portion of said gating circuits to said control circuits to determine the polarity of the output signal train applied to said output terminals.

2. A multi-channel transmitting distributor system for translating multi-element fixed length code characters from simultaneous form to serial form including a signal element regenerator comprising a reciproconductive circuit having at least one stable state of equilibrium and complementary output circuits, means to trigger said reciproconductive to one state of equilibrium at signal element rate, means to apply pulses corresponding to signal elements of one nature to said reciproconductive circuit to trigger said circuit to the other state of equilibrium, whereby the output circuits of said reciproconductive circuit provide separate output signal trains of opposite polarity directly and indirectly representative of the input signals, an electronic switching circuit coupled to said signal element regenerator circuit, output terminals coupled to said switching circuit, said electronic switching circuit being arranged to connect said output terminals selectively to the complementary output circuits of said signal element regenerator circuit in response to applied switching potential, a bistable reciproconductive system coupled to said electronic switching circuit to develop and apply said switching potential, means to apply triggering pulses to said reciproconductive system at channel signal rate to trigger the same to alternate states of conduction, means to apply other potentials to said reciproconductive system to reverse the sense of any triggering thereof, a signal gating circuit arranged to serially apply pulses indicative of applied input signal elements of said one nature to said reciproconductive circuit, and means to derive said triggering pulses from portions of said gating circuits for application to said reciproconductive system to reverse the polarity of the output signal train applied to said output terminals on alternate channels.

3. A multi-channel transmitting distributor system for translating multi-element, fixed-length code characters from simultaneous form to serial form including a signal element regenerator comprising a bistable reciproconductive circuit having two states of equilibrium and complementary output circuits, means to trigger said reciproconductive circuit to one state of equilibrium at signal element rate, means to apply pulses corresponding to signal elements of one nature to said reciproconductive circuit to trigger said circuit to the other state of equilibrium, whereby the output circuits of said signal element regenerator provide separate output signal trains of opposite polarity directly and indirectly representative of the input signals, an electronic switching circuit coupled to said signal element regenerator, output terminals coupled to said switching circuit, said electronic switching circuit being arranged to connect said output terminals selectively to the complementary output circuits of said signal element regenerator circuit in response to applied switching potential, a bistable reciproconductive system coupled to said electronic switching circuit to develop and apply said switching potential, a gating circuit arranged to serially apply pulses indicative of applied input signal elements of said one nature to said reciproconductive circuit, and means to apply pulses derived from separate channel portions of said gating circuits to said reciproconductive system to reverse the polarity of the output signal train applied to said output terminals on alternate channels.

4. In a multi-channel transmitting distributor system for translating multi-element fixed length code characters from simultaneous form to serial form, a signal element regenerator comprising a reciproconductive circuit having at least one stable state of equilibrium and complementary output circuits, means to trigger said reciproconductive circuit to one state of equilibrium at signal element rate, means to apply pulses corresponding to signal elements of one nature to said reciproconductive circuit to trigger said circuit to the other state of equilibrium, whereby the output circuits of said reciproconductive circuit provide separate output signal trains of opposite polarity directly and indirectly representative of the input signals, an electronic switching circuit coupled to said signal element regenerator, output terminals coupled to said switching circuit, said electronic switching circuit arranged to provide two alternate conducting paths upon application of predetermined switching potential to connect said output terminals selectively to the complementary output circuits of said signal element regenerator.

5. In a multi-channel transmitting distributor system for translating multi-element fixed length code characters from simultaneous form to serial form, a signal element regenerator comprising a bistable reciproconductive circuit having complementary output circuits, means to trigger said bistable reciproconductive circuit to one state of equilibrium at signal element rate, means to apply pulses corresponding to signal elements of one nature to said reciproconductive circuit to trigger said circuit to the other state of equilibrium, whereby the output circuits of said reciproconductive circuit provide separate output signal trains of opposite polarity directly and indirectly representative of the input signals, output terminals, an electronic switching circuit comprising a pair of electron discharge tubes having grid connections individual to the complementary output circuits of said signal element regenerator, common cathode connections and common anode connections to said output terminals, a further switching element arranged to apply predetermined direct potentials between the grids and cathodes of said electron discharge tubes to connect said output terminals selectively to the complementary output circuits of said signal element regenerator.

6. In a transmitting diplex distributor, a signal regenerator including a bistable reciproconductive circuit having two cross-connected tubes arranged to conduct alternately, means to apply pulses to one of said tubes at signal element rate to cause said signal regenerator to tend to produce output signal elements of given nature, means to apply pulses wider than the first said pulses and corresponding to signal elements of nature opposite to said given nature to the other of said tubes to produce output signal elements of opposite nature, an electronic switch circuit comprising triode tubes individually coupled to said reciproconductive tubes, an output circuit connected in common to said triode tubes, and switching means connected to said triode tubes selectively to render one tube conducting and the other blocked, thereby to reverse the polarity of the output signal train.

7. In a transmitting diplex distributor a signal regenerator including a bistable reciproconductive circuit comprising a pair of cross-connected electron discharge structures having cathode, grid and anode electrodes, means to apply pulses of energy in the cathode circuit of one of said structures at signal element rate to trigger said reciproconductive circuit to a condition of equilibrium wherein said one electron discharge structure is conducting and the other structure is blocked, a signal control tube comprising a control grid, a cathode connected to the cathode electrode of said other structure and an anode connected to the anode electrode of said other structure, means to apply pulses wider than the first said pulses and corresponding to input signal elements of one nature to the control grid of said control tube to trigger said bistable reciproconductive circuit to the other condition of equilibrium, whereby potentials at the individual anode electrodes of said electron discharge structures form separate output signal trains directly and indirectly representative of the input signal train, output terminals, an electronic switching circuit coupled to said signal element regenerator, said switching circuit including a pair of electron discharge tubes having common anode connections to said output terminals, common cathode connections and grid connections individual to the anode electrodes of said cross-connected electron discharge structures, said means comprising bistable reciproconductive system with cross-connected electron discharge systems having the anodes thereof individually connected to the grids of said switching tubes to bias said switching tubes selectively to couple the anode electrodes of said electron discharge structures to said output terminals, means to apply differentiated pulses at channel rate in the cathode circuits of said electron discharge systems to trigger said reciproconductive system to alternate conditions of conduction, said means comprising control amplifier tubes having anodes individually coupled to the grids of said electron discharge systems and having grid and cathode input circuits to apply pulses wider than channel rate pulses to the grids of said electron discharge systems, thereby to override the pulses applied to the cathodes to trigger said bistable reciproconductive system to a desired condition of conduction, means to apply a triggering pulse to the grid input of one of said control amplifier tubes to trigger said reciproconductive system to a predetermined state of conduction, and means to apply a direct potential to said cathode input circuits to cause said reciproconductive system to the opposite state of conduction on application of said one pulse to the grid input circuit.

8. In a two-channel transmitting diplex distributor for translating multi-element fixed length code characters, a signal regenerator circircuit including a bistable reciproconductive circuit comprising a pair of cross-connected electron discharge structures having cathode, grid and anode electrodes, a capacitor and a diode element connected as a differentiating network in the cathode circuit of one of said structures, means to apply narrow pulses of energy to said differentiating network at signal element rate to trigger said reciproconductive circuit to the condition of equilibrium wherein said one electron discharge structure is conducting and the other structure is blocked, a signal control tube comprising a cathode connected to the cathode electrode of said other structure, an anode connected to the anode electrode of said other structure and a control grid, means to apply pulses wider than the said narrow pulses and corresponding to input signal elements of one nature to the control grid of said control tube to trigger said bistable reciproconductive circuit to the other condition of equilibrium, whereby potentials at the individual anode electrodes of said electron discharge structures form separate output signal trains directly and indirectly representative of the input signal train, an electronic switching circuit coupled to said signal regenerator circuit, output terminals coupled to said electronic switching circuit, said electronic switching circuit including a pair of triode tubes having common anode connections to said output terminals, common cathode connections and grid connections individual to the anode electrodes of said cross-connected electron discharge structures, said means comprising a bistable reciproconductive system including cross-connected electron discharge system having the anodes thereof individually connected to the grids of said switching tubes to said switching tubes selectively to couple the anode electrodes of said electron discharge structures to said output terminals, capacitors and diode elements connected as differentiating networks in the cathode circuits of said electron discharge systems, means to apply pulses at channel rate across said differentiating network to apply narrow pulses to said reciproconductive system to trigger the same to alternate conditions of conduction, said means comprising triode control amplifiers having the anodes individually coupled to the grids of said electron discharge systems and having grid and cathode input circuits to apply pulses wider than said channel rate pulses to the grids of said electron discharge systems to override said channel rate pulses to trigger said bistable reciproconductive system to a desired condition of conduction, means to apply a triggering pulse to the grid input of one of said control amplifiers to trigger said reciproconductive system to a predetermined state of conduction, means to apply a direct potential to one of said cathode input circuits to cause said reciproconductive system to be triggered to the opposite state of conduction on application of said triggering pulse to the grid input circuit corresponding to the one cathode input circuit, a gating circuit comprising a plurality of triode tubes, a plurality of gating control tubes having the anodes thereof connected to the cathodes of the corresponding gating tubes, a common resistor connected to all of the anodes of said gating tubes and coupled to the grid of said signal control tube, means to apply harmonically related timing waves in predetermined permutations to the grids of said gating control tubes to pulse said gating tubes to an operating point just below conduction one at a time in succession, means to apply input signal elements to said gating tubes to produce said pulses corresponding to input signal elements of one nature, and means to apply pulses from the first gating control tubes of each channel to said reciproconductive systems to control the polarity of the output signal train applied to said output terminals.

9. In a transmitting diplex distributor, a signal regenerator including a bistable reciproconductive circuit having two cross-connected tubes arranged to conduct alternately, means to apply pulses to one of said tubes at signal element rate to cause said signal regenerator to tend to produce output signal elements of given nature, means to apply pulses wider than the first said pulses and corresponding to signal elements of nature opposite to said given nature to the other of said tubes to produce output signal elements of opposite nature, an electronic switch circuit comprising triode tubes individually coupled to said reciproconductive tubes, an output circuit connected in common to said triode tubes, and switching means connected to said triode tubes selectively to render one tube conducting and the other blocked, thereby to reverse the polarity of the output signal train, said switching means comprising a bistable reciproconductive system having two cross-connected tubes, means to apply pulses to said reciproconductive system at channel switching rate to reverse the polarity of the output signal train, said means comprising a channel gating control circuit.

10. In a telegraph signal transmission system, means to generate a plurality of harmonically related timing waves, a plurality of signal gating tubes normally blocked by applied potentials well below cutoff potential of the tubes, means to apply said timing waves to said signal gating tubes to raise the applied potentials on but one of the gating tubes substantially to cutoff potential at a given instant, means to apply voltages representative of signal elements of a given code character simultaneously and indvidually to said signal gating tubes, and a signal element regenerator circuit connected in common to said gating tubes.

11. In a telegraph signal transmission system, means to generate a plurality of harmonically related timing waves, a plurality of signal gating tubes, means to apply operating potentials to said signal gating tubes to maintain the same normally well below cutoff condition, means to permute said timing waves to said signal gating tubes to raise the condition of conduction of but one of the same to substantially cut off in succession, a common output load element connected to said gating tubes and means to apply voltages representative of the signal elements of a given code character to said gating tubes simultaneously, thereby to reproduce said signal elements at said common load element consecutively.

12. In a telegraph signal transmission system, means to generate a plurality of harmonically related timing waves, a plurality of signal gating tubes each having cathode, grid and anode electrodes, means to apply operating potentials to said signal gating tubes to maintain the same normally well below cutoff condition, means to apply said timing waves to the cathode electrodes of said signal gating control tubes to raise the condition of conduction of but one of the same to substantially cut off in succession, a common output load element connected to the anode electrodes of said gating tubes, and means to apply voltages representative of the signal elements of a given code character to the grid electrodes of said gating tubes simultaneously, thereby to reproduce said signal elements at said common load element consecutively.

13. In a telegraph signal transmission system, means to generate a plurality of harmonically related timing waves, a plurality of signal gating tubes each having cathode, grid and anode electrodes, a plurality of gating control tubes each having a cathode, grid and an anode, said gating control tubes being individually connected in the cathode circuit of said signal gating tubes, means to apply operating potential to said tubes to render said gating tubes normally well below cutoff, means to apply said timing waves to the grids of said gating control tubes to render but one of the gating tubes substantially at cutoff potential at a given instant, a resistor connected in common to the anode electrodes of said gating tubes, and means individually and simultaneously to apply voltages representative of the signal elements of a given code character to the grid electrodes of said gating tubes, thereby to reproduce said signal elements sequentially across said common resistor.

14. In a multi-channel transmitting distributor system for translating multi-element, fixed-length code characters from simultaneous form to serial form, a signal element regenerator comprising a bistable reciproconductive circuit having two states of equilibrium and complementary output circuits, means to trigger said reciproconductive circuit to one state of equilibrium at signal element rate, means to apply pulses corresponding to signal elements of one nature to said reciproconductive circuit to trigger said circuit to the other state of equilibrium, whereby the output circuits of said signal element regenerator provide separate output signal trains of opposite polarity directly and indirectly representative of the input signals, an electronic switching circuit coupled to said signal element regenerator, output terminals coupled to said switching circuit, said electronic switching circuit being arranged to connect said output terminals selectively to the complementary output circuits of said signal element regenerator in response to applied switching potential, a bistable reciproconductive system coupled to said electronic switching circuit to develop and apply said switching potential, control tubes connected to said reciproconductive system and having complementary grid and cathode input circuits, means to apply relatively narrow pulses to said reciproconductive system at channel rate to trigger the same to alternate states of conduction, means to apply wider pulses to the grid input circuit of one of said control tubes to reverse the triggering of said reciproconductive system, and means to apply potential to the cathode input circuit of said one tube to nullify the application of the polarity reversing pulses to the grid input circuit.

15. In a transmitting diplex distributor, a signal element regenerator circuit producing potentials at output connections thereof directly and indirectly representative of the input signal train, output terminals, an electronic switching circuit coupled to said signal regenerator circuit and including a pair of triode tubes having common anode connections to said output terminals, common cathode connections and grid connections individually made to the output connections of said signal element regenerator circuit and a bistable reciproconductive system having two cross-connected electron discharge systems with the anodes thereof individually connected to the grids of said switching tubes to bias said switching tubes selectively to couple the output connections of said regenerator circuit to said output terminals, differentiating networks in the cathode circuits of said electron discharge systems, means to apply pulses across said networks to trigger said reciproconductive system to alternate conditions of conduction, triode control amplifiers having the anodes individually coupled to the grids of said electron discharge systems and having a grid input circuit to apply pulses to the grids of said electron discharge systems to override the differentiated pulses applied to the cathodes, and means to apply a pulse to the grid input of one of said control amplifiers to trigger said reciproconductive system to a desired state of conduction.

16. In a transmitting diplex distributor, the arrangement as defined in claim 15 wherein said triode control amplifiers also have cathode input circuits and means to apply a direct potential to said cathode input circuit to trigger said reciproconductive system to the opposite state of conduction on application of said one pulse to said grid input circuit.

17. In a transmitting diplex distributor a signal regenerator circuit including a bistable reciproconductive circuit comprising a pair of cross-connected electron discharge structures having cathode, grid and anode electrodes, means to apply pulses of energy in the cathode circuit of one of said structures at signal element rate to trigger said reciproconductive circuit to a condition of equilibrium wherein said one electron discharge structure is conducting and the other structure is blocked, a signal control tube comprising a control grid, a cathode connected to the cathode electrode of said other structure and an anode connected to the anode electrode of said other structure, means to apply pulses wider than the first said pulses and corresponding to input signal elements of one nature to the control grid of said control tube to trigger said bistable reciproconductive circuit to the other condition of equilibrium, whereby potentials at the individual anode electrodes of said electron discharge structures form separate output signal trains directly and indirectly representative of the input signal train, output terminals, an electronic switching circuit coupled to said signal regenerator circuit, said switching circuit including a pair of electron discharge tubes having common anode connections to said output terminals, common cathode connections and grid connections individual to the anode electrodes of said cross-connected electron discharge structures, said signal regenerator circuit comprising a bistable reciproconductive system with cross-connected electron discharge systems having the anodes thereof individually connected to the grids of said switching tubes to bias said switching tubes selectively to couple the anode electrodes of said electron discharge structures to said output terminals, means to apply pulses at channel rate in the cathode circuits of said electron discharge systems to trigger said reciproconductive system to alternate conditions of conduction, said means comprising control amplifier tubes having anodes individually coupled to the grids of said electron discharge systems and having grid and cathode input circuits to apply pulses wider than said channel pulses to the grids of said electron discharge systems, thereby to override the pulses applied to the cathodes to trigger said bistable reciproconductive system to a desired condition of conduction, means to apply a triggering pulse to the grid input of one of said control amplifier tubes to trigger said reciproconductive system to a predetermined state of conduction, and means to apply a direct potential to said cathode input circuits to cause said reciproconductive system to the opposite state of conduction on application of said one pulse to the grid input circuit, a gating circuit comprising a plurality of triode tubes, a plurality of gating control tubes having the anodes thereof connected to the cathodes of the corresponding gating tubes, a common anode impedance element connected to all of the anodes of said gating tubes and coupled to said signal control tube, means to apply harmonically related timing waves in predetermined permutations to the grids of said gating control tubes to pulse said gating tubes to an operating point just below conduction successively, means to apply input signal elements to said gating tubes and means to apply pulses from the first gating control tubes of each channel to said reciproconductive systems to control the polarity of said output signal train applied to said output terminals.

18. A multi-channel transmitting distributor system for translating multi-element fixed length code characters from simultaneous form to serial form including a signal element regenerator comprising a reciproconductive circuit having at least one stable state of equilibrium and complementary output circuits, means to trigger said reciproconductive circuit to one state of equilibrium at signal element rate, means to apply pulses corresponding to signal elements of one nature to said reciproconductive circuit to trigger said circuit to the other state of equilibrium, whereby the output circuits of said reciproconductive circuit provide separate output signal trains of opposite polarity directly and indirectly representative of the input signals, an electronic switching circuit coupled to said signal element regenerator circuit, output terminals coupled to said switching circuit, said electronic switching circuit being arranged to connect said output terminals selectively to the complementary output circuits of said signal element regenerator circuit in response to applied switching potential, a bistable reciproconductive system coupled to said electronic switching circuit to develop and apply said switching potential, means to apply triggering pulses to said reciproconductive system at channel signal rate to trigger the same to alternate states of conduction, a signal gating circuit arranged to serially apply pulses indicative of applied input signal elements of said one nature to said reciproconductive circuit, and means to derive said triggering pulses from portions of said gating circuits for application to said reciproconductive system to reverse the polarity of the output signal train applied to said output terminals on alternate channels.

References Cited in the file of this patent

UNITED STATES PATENTS

| Number | Name | Date |
|---|---|---|
| 2,520,953 | Norris et al. | Sept. 5, 1950 |
| 2,607,035 | Levine | Aug. 12, 1952 |
| 2,609,451 | Hansen | Sept. 2, 1952 |
| 2,609,452 | Hansen | Sept. 2, 1952 |